(No Model.)
B. J. WESTERVELT.
CAR WHEEL.
No. 375,466. Patented Dec. 27, 1887.
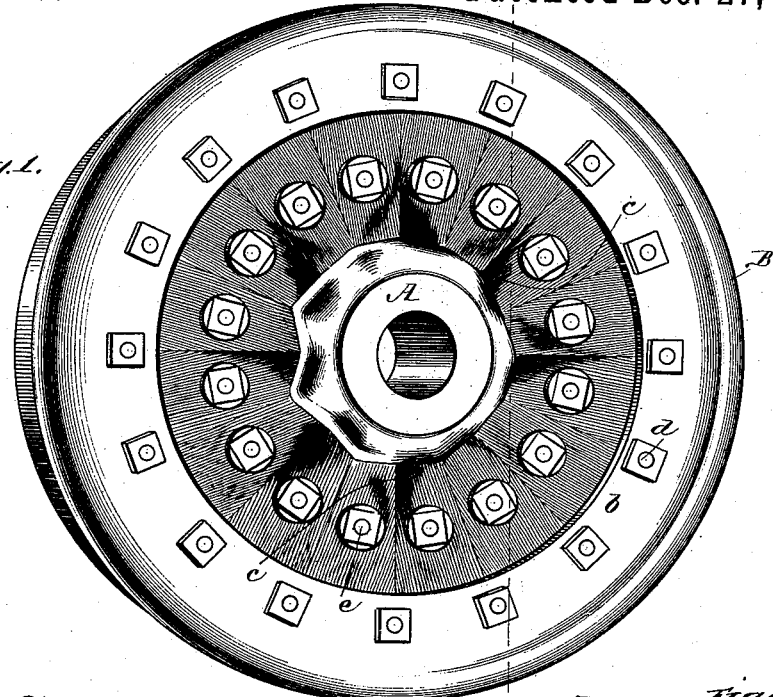
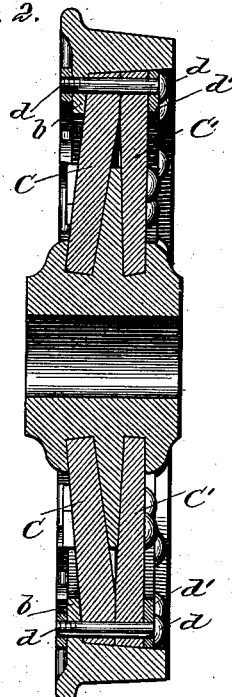
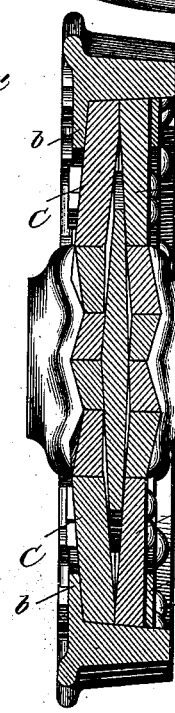
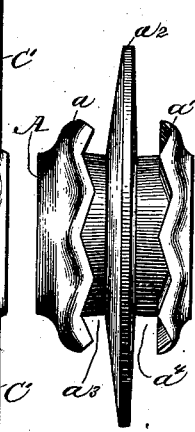
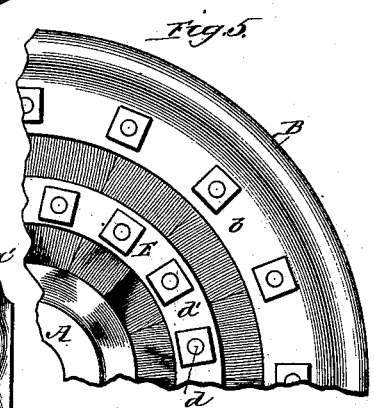
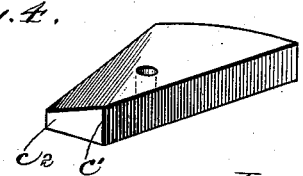
Witnesses,
Inventor
Benjamin J. Westervelt
By Pine & Fisher
His Attys.

UNITED STATES PATENT OFFICE.

BENJAMIN J. WESTERVELT, OF BUDA, ILLINOIS, ASSIGNOR TO THE BUDA FOUNDRY AND MANUFACTURING COMPANY, OF SAME PLACE.

CAR-WHEEL.

SPECIFICATION forming part of Letters Patent No. 375,466, dated December 27, 1887.

Application filed November 22, 1887. Serial No. 255,872. (No model.)

*To all whom it may concern:*

Be it known that I, BENJAMIN J. WESTERVELT, a citizen of the United States, residing at Buda, in the county of Bureau, State of Illinois, have invented certain new and useful Improvements in Car-Wheels, of which I do declare the following to be a full, clear, and exact description, reference being had to the accompanying drawings, forming part of this specification.

My present invention has relation to that class of car-wheels the bodies whereof are composed of wooden sections suitably united to metallic hubs and tires; and more particularly does my invention relate to such wheels the wooden sections of which are composed of a series of spokes or segments set together with their edges abutting. In the construction of car-wheels having wooden bodies it has been heretofore proposed to form such bodies of two disks or circular sections of multiple cross-grained veneers which extended between the hub and the tire and were attached to a central flange projecting from each by means of suitable retaining rings and bolts. In this construction of car-wheels the faces of the wooden bodies were perfectly plain—that is to say, they extended in the radial plane of the wheel, except for a slight inclination from hub to tire.

One object of my present invention is to improve this construction of car-wheels, so that while the advantage incident to the use of a wooden body for the wheel shall be retained, the material of this body shall be so disposed as to give to the wheel increased strength and durability.

A further object of my invention, and one which is applicable to the construction of wheels whether made of segments or of disks, is to provide improved means for attaching the wooden sections to the hub, in order that greater strength may be given to the sections while retaining the advantage of durability and lightness.

To this end my invention consists in the various novel features of construction hereinafter described, illustrated in the accompanying drawings, and particularly defined in the claims at the end of this specification.

Figure 1 is a view in perspective of a car-wheel embodying my invention. Fig. 2 is a view on line $x\ x$ of Fig. 1. Fig. 3 is a view on line $y\ y$ of Fig. 1. Fig. 4 is a detail side view of my improved wheel-hub. Fig. 5 is a fractional side view of a slightly-modified construction of wheel. Fig. 6 is a detail perspective view of one of the wheel spokes or segments of which the circular sections of the body are formed.

A designates the hub, and B the tire, of the wheel, between which will be held the wooden body that is formed of the two sections C and C'. The periphery of the hub A is provided with the outer flanges, $a$ and $a'$, and with the intermediate web or fin, $a^2$, these flanges and web being so arranged with respect to each other as to form around the periphery of the hub the grooves $a^3$ and $a^4$, which serve to receive the inner edges or portions of the wooden sections comprising the body of the wheel. In the form of my invention illustrated in the drawings each section of this wooden body is shown as composed of a series of spokes or segments, (cut lengthwise of the grain of the wood,) the edges of which abut against each other so as to form in effect a continuous circular section on each side of the central web or fin, $a$, of the hub, and the outer surfaces of those portions of the sections adjacent the hub are formed with a series of corrugations, $c$, which gradually vanish toward the tire. These corrugations $c$ in the outer face of the sections are due to the fact that the spokes or segments of which the sections are formed have the outer surfaces of their inner portions inclined from the radial plane of the wheel, such inclination gradually decreasing from the hub toward the tire, adjacent to which latter part the outer surfaces of the spokes or segments may be flat—in other words, the inner portion of each spoke or segment is formed of varying thickness in transverse section, as seen more particularly in Figs. 3 and 6 of the drawings—that is to say, the portion $c$ of each spoke or segment being thicker than the portion $c'$, so that when the thickened portions of adjacent segments abut against each other they will form a ridge or corrugation, the adjacent thinner portions of the succeeding segments forming corresponding depressions. My purpose in thus forming the wooden sections (one or both)

with a series of corrugations upon their outer surfaces adjacent the hub is to give increased bearing-surface for the body upon the hub without the necessity of increasing the thickness of the wood or the weight of the wheel, and as well also to form a series of arches or braces which will effectively serve to resist any lateral strain upon the wheel. The outer portions, or portions adjacent the tire of the wooden sections, are preferably of uniform thickness, thus differing from the inner portions adjacent the hub, this being due to the fact that the inner portion of each spoke is cut away or inclined to form the radial corrugations, my purpose in thus leaving the outer portions of the spokes or segments of uniform thickness being to afford a broad bearing-surface against the inner face of the tire B, to the inner flange, $b$, of which the sections are attached by means of the usual through-bolts $d$ and retaining-ring $d'$.

The inner faces of the wooden sections are shown as flat or plain and bearing against the inclined surfaces of the web or fin $a^2$; but it will be readily understood that if preferred this web could be made with corrugations upon one or both sides, the inner surfaces of one or both sections being correspondingly cut to fit in such corrugations. The body of the wheel is attached to the hub by driving the inner ends of the several spokes or segments into the grooves $a^3$ and $a^4$, the segments being arranged with respect to each other in such manner as to form the series of radial corrugations around the hub. The web or fin $a^2$, projecting from the periphery of the hub A, extends to a point about midway between the hub and tire, the purpose of this construction being to afford a firm brace for the wooden sections at a distance beyond their points of attachment to the hub, and the sections C and C' are preferably bolted to the web or fin $a^2$, near its outer portion, by means of the through-bolts $e$. If desired, a retaining ring or rings, E, may be also applied to the outer faces of one or both of the wooden sections, as seen in Fig. 5, against which the heads and nuts of the bolts $e$ will bear. The extension of the web or fin $a^2$ beyond the flanges $a$ and $a'$ and to a point approximately midway between the hub and tire is an important feature, inasmuch as it serves to better brace the body of the wheel against any lateral strain, which but for such extension of the web or fin would be thrown chiefly upon the inner ends of the segments.

It will be readily understood that features of my invention are applicable to the construction of wheels the bodies of which are formed of duplex wooden sections of uniform thickness, or to wheels in which one of the duplex sections only has its outer surface provided with radial corrugations, and except where so stated I do not wish my claims to be understood as restricted to the precise details of construction illustrated in the drawings.

Having thus described my invention, what I claim as new, and desire to secure by Letters Patent, is—

1. In a car-wheel, the combination, with the hub and the tire, of a body formed of two sections and comprising wooden segments having the outer surfaces of their inner ends inclined from the radial plane of the wheel to form corrugations, substantially as described.

2. In a car-wheel, the combination, with the hub and the tire, of two wooden sections, the spokes or segments of each of said sections having their outer faces inclined from the radial plane of the wheel, the adjoining edges of each set of spokes or segments being arranged so as to form a series of radial corrugations around the outer faces of the wheel, substantially as described.

3. In a car-wheel, the combination, with a hub and tire, of a wooden body comprising two circular sections having thickened outer portions and reduced inner portions spread apart and bolted to the hub and tire, substantially as described.

4. In a car-wheel, the combination, with a body consisting of two wooden sections, of a tire attached to the outer edges of said sections, and a hub whereon the inner edges of said sections are held, said hub being provided with a central brace fin or web extending to approximately a central point between the hub and tire, substantially as described.

5. In a car-wheel, the combination, with a wooden body consisting of two sets of spokes or segments, of a tire to which the outer ends of said segments are bolted, and a hub having double grooves to receive the ends of said segments, and a central web or fin between said grooves, substantially as described.

6. In a car-wheel, the combination of a body formed of two sections comprising a double set of spokes or segments having their outer faces inclined from a radial plane, so as to give to the surfaces of the body radial corrugations, a tire to which the outer ends of said segments are bolted, and a hub having one or more peripheral corrugated flanges, substantially as described.

BENJAMIN J. WESTERVELT.

Witnesses:
JOHN W. PLAIN,
CHAS. C. SHEPARD.